United States Patent [19]

Nakamura et al.

[11] Patent Number: 5,187,245

[45] Date of Patent: Feb. 16, 1993

[54] METHOD OF ADDITION OF POLYMERIZATION INITIATOR

[75] Inventors: Tatsumi Nakamura; Mineo Nagano, both of Yokkaichi, Japan

[73] Assignee: Tosoh Corporation, Shinnanyo, Japan

[21] Appl. No.: 815,911

[22] Filed: Jan. 2, 1992

Related U.S. Application Data

[63] Continuation of Ser. No. 605,312, Oct. 30, 1990, abandoned.

[30] Foreign Application Priority Data

Nov. 13, 1989 [JP] Japan .................. 1-292494

[51] Int. Cl.$^5$ .......................... C08F 2/18; C08F 2/22
[52] U.S. Cl. ............................ 526/88; 526/344.2; 526/345; 526/218.1; 526/227; 526/919; 526/920; 525/317; 525/260; 525/263; 422/131
[58] Field of Search ............ 526/74, 88, 219.5, 344.2, 526/919, 920, 218.1, 227; 422/131; 525/317

[56] References Cited

U.S. PATENT DOCUMENTS

| | | | |
|---|---|---|---|
| 3,451,985 | 6/1969 | Mahlo | 526/344.2 X |
| 3,488,328 | 1/1970 | Koyanagi | 526/344.2 X |
| 3,790,036 | 2/1974 | Miller | 526/86 X |
| 5,064,917 | 11/1991 | Amano | 526/72 |

FOREIGN PATENT DOCUMENTS 60-86104  5/1985  Japan .
63-41507  2/1988  Japan .

Primary Examiner—Joseph L. Schofer
Assistant Examiner—M. Nagumo
Attorney, Agent, or Firm—Armstrong, Westerman, Hattori, McLeland & Naughton

[57] ABSTRACT

A method of addition of polymerization initiator in the process of suspension polymerization or emulsion polymerization polymerizing a polymerizable monomer in aqueous medium, comprising introducing a low-temperature-active polymerization initiator taking part in the polymerization reaction to a piping system filled beforehand with water and successively adding said initiator in the piping system to polymerization system within 20 minutes using water.

7 Claims, 2 Drawing Sheets

METHOD OF ADDITION OF POLYMERIZATION INITIATOR

This application is a continuation of application Ser. No. 07/605,312 filed Oct. 30, 1990, now abandoned.

BACKGROUND OF THE INVENTION

The present invention relates to a method of addition of polymerization initiator and, in more detail, to a charging method of polymerization initiator capable of charging low-temperature-active polymerization initiator into polymerization system at ordinary temperature.

In the so-called suspension polymerization wherein a polymerizable monomer, for example, vinyl chloride monomer is polymerized by the use of aqueous medium, low-temperature-active organic peroxides or azo-bis compounds are used as initiators for polymerization reaction.

Recent trends of manufacturing process are as follows:

1) Polymerization is performed in a closed system using antifouling agent or the like. This is for omitting the conventional procedure of opening manhole every batch for the removal of scale, for preventing the escape of gas remaining in the reactor, for avoiding the problems of labor and common environment, and further for shortening the time of one cycle to improve the productivity and reduce the cost.
2) Uniform development of heat of reaction has been sought for shortening the reaction time and improving the productivity because it permits easy heat removal and easy control of reaction as well, and initiators which are more active at low temperature have come to be used most frequently. That is, a plurality of initiator types having appropriate characteristics to reaction temperature have come to be selected for use in combination as if they were starting, relay and relief pitchers in ball game.
3) Organic peroxide initiators have some water solubility. Thus, when they are added beforehand to an aqueous phase and thereafter monomer is added to polymerize, the polymerization product in aqueous phase becomes bead-like nonporous particles to increase the fish-eye characteristic of final product. It is necessary therefore to charge these peroxide initiators into monomer phase.

Moreover, all of these initiators decompose more or less depending on their types. Hence, it is necessary to retain them at a low temperature lower than 5° C. for preventing the decomposition.

Based on these reasons, a method is taken for charging initiators such that the initiators retained at low temperature are metered immediately before charging and charged into a closed polymerization reactor by throwing them at once into an equalizing charger or charged with a booster pump, but it does not match to the modern times because of taking time and insufficient charge accuracy. Moreover, the conventional automatic charging method of initiator uses a double-pipe system (i.e., a pipe arrangement having an inner pipe and an outer pipe in a concentric relationship), and the outside is retained at low temperature by passing refrigerant of 5 to −20° C., thus performing the metered charging.

The method disclosed in Japanese Unexamined Patent Publication No. Sho 63-41507 is a pioneering work to the invention, which teaches the simultaneous addition of initiator to a water slurry of various powdery additives to be added for polymerization reaction. This is not practical however as a charging method of initiator, since the initiator is adsorbed onto various additives and exerts interactions.

When charging initiator into a polymerization system by the conventional method using a double-pipe system, 1) Double-pipe, cooling equipment and refrigerant-circulating equipment are required, thus, in the case of having many polymerization reactors or permitting several types of initiators to be charged at an arbitrary rate, considerable capital investment is required,
2) The initiators are present in the piping system at all times, thus maintenance and management costs such as power etc. are required for cooling, and
3) If the temperature of the initiator rises due to accidents such as power failure etc., the decomposition begins resulting in the dangers of explosion and fire in extreme cases, thus, in such cases, there is troublesome work such as draining of contents, and washing which are required (it is not preferable to have potentially dangerous factors in a plant).

As described above, the charging method of prior art has unpreferable problems. As a result of diligent investigations, the inventors have found a method solving these problems at a stroke, leading to the completion of the invention.

SUMMARY OF THE INVENTION

The invention relates to a method of addition of polymerization initiator characterized in that, in the process of suspension polymerization or emulsion polymerization polymerizing polymerizable monomer in aqueous medium, a low-temperatureactive polymerization initiator taking part in the polymerization reaction is metered and introduced to a piping system filled with water and it is transported at high speed with pure water to add to the polymerization system within 20 minutes.

DETAILED DESCRIPTION OF THE INVENTION

Figure 1:
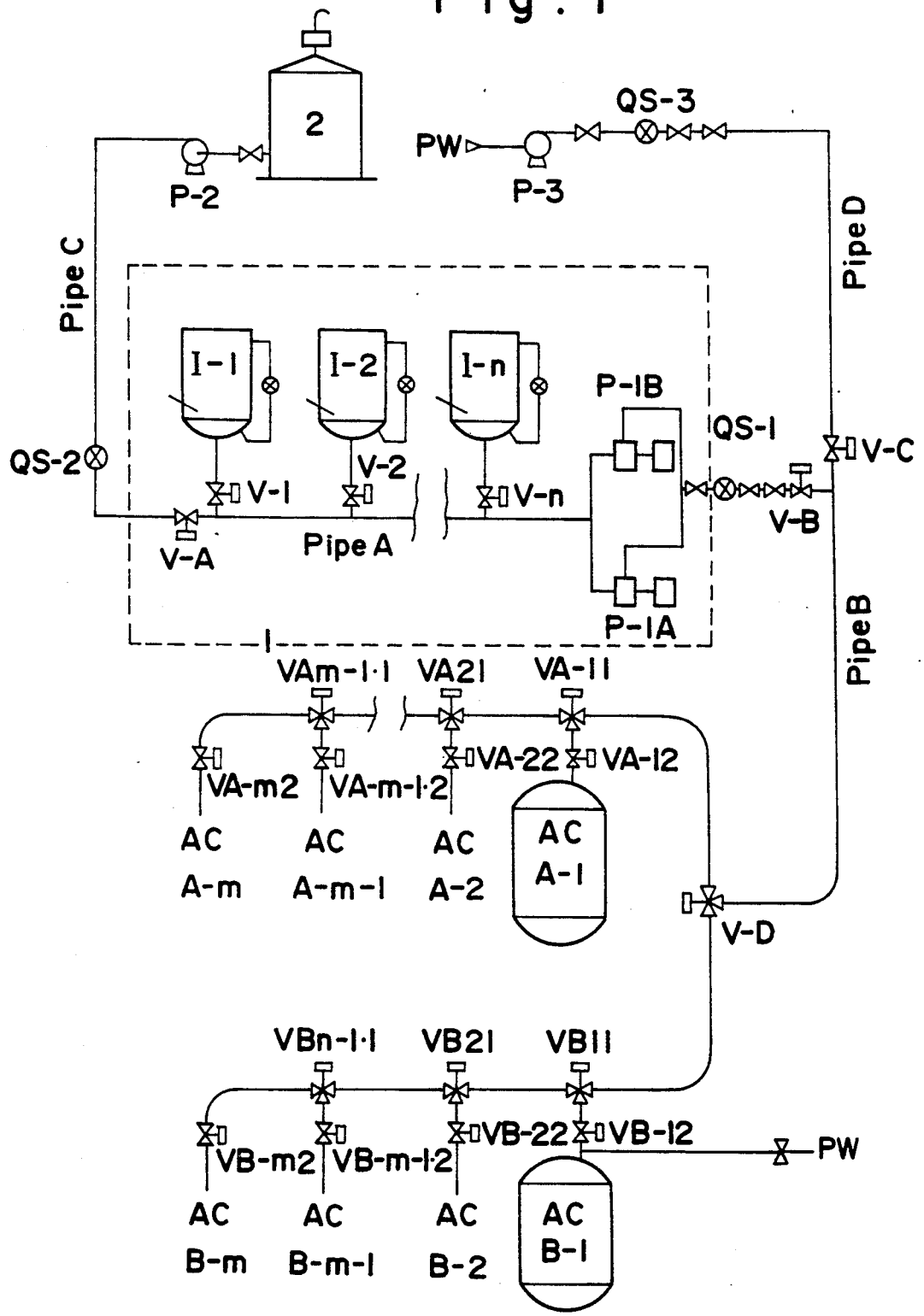
FIG. 1 is a flow diagram of one example on putting the invention into practice and FIG. 2 is a magnified diagram in the vicinity of initiator-charging nozzle of polymerization reactor.

The high-speed transport of polymerization initiator with pure water means a high-speed plug transport. Even if contacted with a piping system of ordinary temperature, the decomposition of the initiator would not cause any problem in practice because of the short time of adding it within 20 minutes (preferably, within 5 minutes).

Moreover, it is easy to charge several types of initiators into the feeding pipe at an arbitrary rate, thus settling with only one feeding pipe.

Furthermore, only pure water remains in the piping system after charging, resulting in less substantial danger.

Besides, after having charged the initiator into the piping system, a solvent being dissolvable into both initiator and water and less affecting on polymerization reaction may be charged in amounts of 1 to 10 times as much as the initiator to raise the washing efficiency in pipes and then the initiator may be transported at high speed with pure water. Also, it is possible to start the charging of the initiator at a point of time when part of a monomer exists in the polymerization reactor and to charge in parallel with the charging of monomer. According to the invention, the quality characteristics of product are excellent and independent setting of time for charging of initiator is unnecessary, thereby preferable results can be achieved also from the production efficiency. In the following, the invention will be illustrated in detail.

The polymerization systems effectively adaptable to the invention are suspension polymerization and emulsion polymerization polymerizing by the use of aqueous medium. For example, the invention is adapted to the polymerization of vinyl chloride monomer alone, copolymerizations thereof with copolymerizable monomers or graft copolymerizations, further polymerizations of monomers for radical-adding type polymerization such as styrene, methacrylic acid and its esters, acrylic acid and its esters, vinylidene chloride, etc. or copolymerizations thereof with copolymerizable monomers.

The polymerization initiators used for these polymerizations are low-temperature-active radical-generators. Typical examples are listed in Table 1.

TABLE 1

| Name of compound | Abbreviation | Half-life temperature for 10 hr (°C.) |
|---|---|---|
| 1) Organic peroxides | | |
| Acetylcyclohexylsulfonyl peroxide | (ACSP) | 26.5 |
| Isobutyryl peroxide | (IB) | 30.5 |
| Cumylperoxy neodecanate | (CND) | 36.6 |
| Diisopropylperoxy dicarbonate | (IPP) | 40.5 |
| Di-2-ethothioxyethylperoxy dicarbonate | (EEP) | 43.4 |
| Di-2-ethylhexylperoxy dicarbonate | (OPP) | 43.5 |
| n-Hexylperoxy neodecanate | (HND) | 44.7 |
| t-Butylperoxy neodecanate | (ND) | 46.5 |
| t-Hexylperoxy pivalate | (HPV) | 53.2 |
| t-Butylperoxy pivalate | (BPV) | 55.0 |
| Lauroyl Peroxide | (LPO) | 62.0 |
| 2) Azobis compounds | | |
| Azobisisobutyronitrile | (AIBN) | |
| Azobisvaleronitrile | (AIVN) | |

From the point of storage stability in the tanks, the initiators are used ordinarily in a form of solution dissolved into an organic solvent at a fixed concentration or a form homogeneously emulsified into water with suspension stabilizer or surfactant, further also in a form homogeneously suspended fine powdery initiator into water with suspension stabilizer.

FIG. 1 is a flow diagram of one example on putting the invention into practice. In the diagram, marks I-1, I-2 . . . I-n indicate initiator tanks and range of dotted line means a low-temperature room. Marks V-1, V-2 . . . V-n indicate automatic valves at the bottom of initiator tanks. Marks P-1A/B and QS-1 indicate quantitative pumps and flowmeter for charging initiator, respectively. Marks 2, P-2 and QS-2 indicate washing methanol and pump and flowmeter therefor, respectively. Marks PW, P-3 and QS-3 indicate pure water and pump and flowmeter therefor, respectively. Marks AC, A-1, A-2 . . . A-m and AC, B-1, B-2 . . . B-m indicate A series and B series polymerization reactors, respectively. Marks VA-12, VA-22 . . . VA-m2 and VB-12, VG-22 . . . VB-m2 indicate A series and B series main automatic valves for reactors, respectively. And, marks VA-11, VA-21 . . . VA-ml and VB-11, VB-21 . . . VB-ml indicate A series and B series automatic three-way valves, respectively.

The initiators to be used are accommodated in tanks I-1, I-2, I-3 . . . I-n. These tanks are installed in low-temperature room 1 and kept at 5° to −20° C. depending on the types of initiators. If placing the number of polymerization reactor requiring the charging on, for example, No. A-m-1, three-way valve V-D is opened to ward A side, valves VA-11 and VA-21 are opened to ward direct feeding side, three-way valve VA-m-1.1 is opened toward reactor side, and main valve for reactor Va-m-1.2 is made opened immediately before charging of initiator, sequentially.

Depending on the polymerization formulations, a tank of initiator is chosen, valve at bottom is opened, initiator is fed with pump P-1 and metered with flowmeter QS-1, discharging valve V-B is opened to charge into feeding pipe B, and thereafter bottom valve of tank is closed.

Similarly, several types of initiators can be charged sequentially in an arbitrary set amount. For pump P-1, pulsation-free quantitative pump is preferable (metering can also be made by the weight of tank or level in place of flowmeter QS-1).

Next, washing solvent (for example, methanol) in tank 2 is metered with flowmeter QS-2 via pump P-2 at amounts of about 1 to 5 times as much as initiator to wash pipe A, which is then fed to pipe B.

Valves V-A and V-B are closed and pumps P-1 and P-2 are stopped. Following this, pure water is metered with flowmeter QS-3 via pump P-3 and, opening valve V-C, it feeds the initiator to fixed reactor by high-speed plug transport through pipe B together with washing of feeding pipe.

It is necessary to determine the diameter of pipe and the capacity and head of pump so that the transport speed ranges from not less than 0.5 m/sec to not more than 20 m/sec, preferably from not less than 1 m/sec to not more than 10 m/sec in order to charge the initiator having been charged into pipe B within 20 minutes, preferably 5 minutes, though depending on the length of charging pipe.

Moreover, as the feeding amount of pure water, 1 to 20 times as much as the capacity of pipe B is required for washing.

Furthermore, the pipes should be bent smoothly without using elbows in order not to make the stagnant portions similar to the pneumatic conveyor for powders. Also, if the aiming charging reactor is, for example, No. B-2, three-way valve V-D is changed over toward B series so that the fluid does not go to A series, further, three-way valve VB-11 is made direct so as the fluid not to enter into pipe for No. B-1, and changing-over sequence toward No. B-2 is required.

Figure 2:
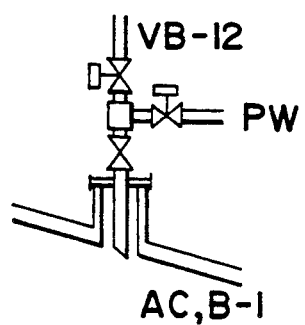

It is preferable to set the flanges and packings of valves etc. to fit the inner diameters perfectly. Moreover, in order to charge the overall amount of initiator into the polymerization reactor, sole pipe-inserting mode is preferable as illustrated FIG. 2. If the inserted pipe of BV-12 into the reactor of AC, B-1 is blocked due to the adherence of polymer during polymerization reaction, working trouble would occur in this charging system. However, the blocking can be prevented by blowing small amount of pure water into the inserted pipe of BV-12 via nozzle tip of PW (shown in FIG. 1 and 2) during polymerization, thus washing and decreasing the temperature. Moreover, if the temperature of pure water for transporting and washing is not higher than 30° C., no problems occur in practice, but cooled pure water may also be used.

The invention exerts following effects.

1. Upon charging the low-temperature-active initiator into polymerization reactor, the invention permits a drastic saving of installation costs such as double-pipe, cooling equipment, refrigerant-circulating equipment, etc. over the conventional method using double-pipe system, circulation of refrigerant and retainment at low temperature, since the inventive method can be used at ordinary temperature.
2. In the conventional system, the initiator is present in piping system at all times. Hence, for charging some types of initiators into polymerization reactor in arbitrary amounts, pipes for every type are required. Whereas, in the inventive system, arbitrary amounts of some types of initiators are charged into one pipe and then they are fed, thus the system can be simplified significantly.
3. Water alone is present in piping system after charging in contrast to conventional system. Hence, the process becomes less dangerous at the time of troubles such as power failure etc.
4. The initiator can be charged into a closed polymerization reactor. High-pressure charge is possible, if installing pumps with head corresponding to the pressure of polymerization reactor.

In the following, the invention will be illustrated concretely based on an example. However, the invention is not confined to the example. "Part" in example means "specific part by weight".

EXAMPLE 1

The polymerization was performed with polymerization instruments constituted as shown in FIG. 1.

At a point of time when 130 parts of pure water and 0.08 parts of partially saponified poly(vinyl alcohol) were charged into a polymerization reactor (No. A-2) under an atmosphere of monomer and then 10 parts of vinyl chloride monomer were placed, 0.009 parts (amount of pure ingredient) of CND and 0.021 parts (amount of pure ingredient) of OPP were charged into pipe B from tank I-1 and tank I-2 accommodated initiators, respectively, and pipe A was washed with 0.10 part of methanol in tank 2, which was charged into pipe B. Then, these were fed into the polymerization reactor with 0.4 parts of pure water of 30° C. The flow rate in piping system were was 1.5 m/sec and the total time required for the procedure of charging of initiators was within 5 minutes. During this charging of initiators, charging of vinyl chloride was continued, which was stopped at 100 parts in total.

Stirring the contents, the temperature was raised to perform the polymerization of 57° C. Unreacted monomer was collected at a pressure in reactor wherein the polymerization rate reached 85% and, after the residual monomer was removed by stripping, dewatering and drying were performed to obtain vinyl chloride polymer. The polymerization time required was 8 hr.

COMPARATIVE EXAMPLE 1

Employing the same polymerization reactor as in Example 1 and opening the manhole, pure water and partially saponified poly(vinyl alcohol) were charged in the same parts as in Example 1 under an atmosphere of air. After same parts of premetered initiators CND and OPP as in Example 1 were thrown-in from manhole, manhole was closed and air was removed, then same parts of vinyl chloride as in Example 1 were charged to perform the polymerization at the same reaction temperature. The polymerization time was 9.0 hr.

COMPARATIVE EXAMPLE 2

Into the same polymerization reactor as in Example 1, pure water and partially saponified poly(vinyl alcohol) were charged in the same parts as in Example 1 under an atmosphere of vinyl chloride monomer. When 10 parts of vinyl chloride were charged, same parts of premetered initiators CND and OPP as in Example 1 were placed in a equalizing charger and, after deaeration, equalizing charger was taken off to charge the initiators. Thereafter, the equalizing charger was washed with 0.1 part of methanol and with 0.4 parts of water, respectively, and the washings were thrown-in. The reaction was conducted under the same polymerization conditions as in Example 1. The polymerization time was 8.0 hr.

COMPARATIVE EXAMPLE 3

The polymerization was performed employing same instruments and polymerization reactor and using same formulation as in Example 1. However, the flow rate of pure water for feeding the initiators was made to be 0.3 m/sec. It took 30 minutes for charging the initiators. The polymerization time was 9.5 hr.

Results compared the quality characteristics of product in Example 1 with those of products in Comparative examples 1, 2 and 3 are shown in Table 2.

Besides, the fish-eye characteristic was measured by a following method.

With 100 parts of resin, 50 parts of dioctyl phthalate, 3 parts of stabilizer and 0.1 part of Ultramarine Blue were mixed well. The mixture was kneaded with a mixing roll of 150° ±2° C. by fixed procedure and 0.3 mm thick sheets were taken out at 3, 5 and 7 minutes, respectively. A plate with 2 cm-in-diameter holes pierced at random was superposed with the sheet, which was lighted up from backside. Transparent particles were counted with a 5× loupe to express as the number of particles per 50 cm$^2$.

TABLE 2

| | Polymerization time (Hr) | Fish-eye characteristic (Particles/50 cm$^2$) | | | Screening (48 mesh on %) | Screening state | |
|---|---|---|---|---|---|---|---|
| | | 3 min | 5 min | 7 min | | *1 | *2 |
| Example 1 | 8.0 | 35 | 1 | 0 | 0.1 | No | No |
| Comparative example 1 | 9.0 | 280 | 30 | 5 | 0.6 | Yes | No |
| Comparative example 2 | 8.0 | 33 | 1 | 0 | 0.1 | No | No |
| Comparative | 9.5 | 350 | 50 | 30 | 1.0 | No | Yes |

TABLE 2-continued

| Polymerization time (Hr) | Fish-eye characteristic (Particles/50 cm²) | | | Screening (48 mesh on %) | Screening state | |
|---|---|---|---|---|---|---|
| | 3 min | 5 min | 7 min | | *1 | *2 |
| example 3 | | | | | | |

*1 large transparent nonporous particles
*2 Blocked matters

What is claimed is:

1. A method of addition of polymerization initiator in the process of suspension polymerization or emulsion polymerization of a vinyl monomer in aqueous medium, comprising introducing at least one low-temperature active polymerization initiator selected from the group consisting of organic peroxides and azobis compounds from one or more initiator tanks which are cooled to a temperature of from about 5° C. to −20° C. to a single piping system filled beforehand with water and then feeding said initiator in the piping system to one or more polymerization reactors which have been charged with at least a part of said monomer prior to commencement of polymerization within 5 minutes of its introduction into said piping system using water, wherein said piping system is maintained at room temperature.

2. The method of addition of polymerization initiator as claimed in claim 1, wherein the low-temperature active polymerization initiator is metered and introduced to the piping system filled with the water, and then transported with water to a polymerization reactor.

3. The method of addition of polymerization initiator as claimed in claim 1, wherein several types of the initiators in a plurality of initiator tanks connected by a manifold are charged into only one feed-piping system towards a polymerization reactor.

4. The method of addition of polymerization initiator as claimed in claim 1, wherein after having charged the initiator into the piping system, a solvent being dissolvable into both the initiator and water and not affecting the polymerization reaction is charged into said piping system, and then said initiator is transported with the water to a polymerization reactor.

5. The method of addition of polymerization initiator as claimed in claim 1, wherein a single nozzle-fitted inlet is employed to charge the initiator into a polymerization reactor, and is equipped with a nozzle tip for blowing water into the inserted pipe to wash blocking in the inserted pipe and to decrease inside temperature.

6. The method of addition of polymerization initiator as claimed in claim 5, wherein the water used for transporting the initiator towards a polymerization reactor and for washing the inserted pipe is pure water of not higher than 30° C.

7. The method of addition of polymerization initiator as claimed in claim 1, wherein the process of suspension polymerization or emulsion polymerization is one selected from the group consisting of polymerization of vinyl chloride monomer alone, copolymerization thereof with copolymerizable monomer, and graft copolymerization thereof.

* * * * *